3,011,985
POLYVINYL ACETATE AND GLUE
          COMPOSITIONS
Morris Breslouf, Salem, and Frederick W. Stenuis, Lynn,
  Mass., assignors to The Borden Company, a corporation of New Jersey
  No Drawing. Filed Jan. 22, 1957, Ser. No. 635,118
               2 Claims. (Cl. 260—8)

This invention relates to an adhesive composition comprising polyvinyl acetate and glue. The invention is particularly useful in making wood glue or decalcomania adhesive and will be illustrated, therefore, by description in connection with such use.

In view of extensive use, as adhesives, of emulsions of polyvinyl acetate and glue separately, it is not surprising that many attempts have been made to obtain an improved product by mixing the two. The resulting mixture, however, shows incompatibility or coagulates on standing. In seeking to correct such failures, we first tested blending glue with a series of emulsions containing polyvinyl acetate and various protective colloids or agents therefor. In these tests 100 parts of polyvinyl acetate emulsions (55% solids) and the various protective agents were mixed with 30 parts of a commercial liquified glue solution corresponding to 12 parts of glue on the dry basis. The results for the several blends are shown in the following table.

| Protective Agent for PVAc Emulsion | Compatibility after Mixing with Glue | |
|---|---|---|
| | Solution on Standing— | Dry Film is— |
| Polyvinyl alcohol | coagulates | very opaque. |
| Hydroxy ethyl cellulose | thickens | Do. |
| Carboxy methyl cellulose | remains smooth | hazy. |

When, however, we introduce and disperse at least 5% of glue, on the dry weight of the vinyl acetate, into the aqueous emulsion of the vinyl acetate monomer and effect the polymerization of the monomer in direct contact with the dispersed glue, then we obtain an emulsion that remains smooth on standing. On being mixed with additional glue in proportion required to provide up to 50 parts total of glue for 100 dry weight of the polyvinyl acetate (PVAc) emulsion and being formed into films, the films at the worst show only a slight haze. Furthermore, this emulsion so made, when used as an adhesive, leaves a dried film that is strong and either practically clear or only very slightly hazy.

Briefly stated, the present invention comprises a polyvinyl acetate emulsion in which the particles are in the condition of having been polymerized in contact with about 5% or more glue. The invention includes also the herein described process of polymerizing the polyvinyl acetate and glue emulsions including minor proportions of such conventional components as admixed material promoting polymerization of the polyvinyl acetate.

As the vinyl acetate to be used, we employ any commercial grade of the monomer. The vinyl acetate and glue are emulsified together in water before the vinyl acetate is polymerized and maintained in emulsified condition during the polymerization. The vinyl acetate as used may be mixed with a minor proportion of a material copolymerizable therewith, as, for example, dibutyl or diallyl fumarate or maleate or vinyl 2-ethylhexoate.

The glue used in contact with the polymerizing PVAc is animal glue such as bone, hide or fish glue or gelatin. This glue is suitably supplied in dissolved condition.

Any glue added subsequent to the polymerization may be the same as above or an animal glue of high viscosity, used to advantage in combination with such glue liquefying agent as urea, thiourea or calcium chloride in the proportion of 10–50 parts of the said agent for 100 of the glue on the dry basis.

The polymerization promoter, for initiating and controlling polymerization of the vinyl acetate in contact with the emulsified glue, ordinarily contains (1) a polymerization initiator (sometimes called accelerator), (2) a terminating agent for limiting the chain length to which the polymerizaion proceeds, and (3) an alkali.

These materials may be those conventionally used in polyvinyl acetate polymerizations. Examples of materials of these classes that we use follow.

Chain terminators that are satisfactory are dodecyl mercaptan, tertiary butyl mercaptan, and n-hexyl decyl mercaptan.

Polymerization initiators include potassium persulphate, ammonium persulphate, and hydrogen peroxide.

Suitable alkalies are sodium or potassium carbonate, bicarbonate, and hydroxide.

Surface active agents may be used in the emulsions at the various stages. Examples of such agents that we use are Triton X–200 (sodium salt of alkyl aryl polyether sulfonate), Duponol ME (sodium lauryl sulfate), Tween 20 (polyethylene oxide derivative of sorbitan monolaurate containing about 10–20 ethylene oxide units), sorbitan monolaurate and n-octadecyl disodium sulfosuccinamate.

In making the emulsion of the vinyl acetate and the glue before the polymerization is effected, we use at least 5 parts of glue for 100 parts of the vinyl acetate monomer. Glue in excess of 20 parts at this stage is unnecessary.

It is considered that this glue becomes so effectively associated with or bonded into the particles of polyvinyl acetate, during their formation, as to constitute a holding or blending agent for additional glue later added, so as to keep all the glue intimately associated with the said particles in emulsified condition.

The proportions of the ingredients used in minor amounts, including the surface active agent, initiator or accelerator of polymerization, chain terminator, and alkali are in proportions for the several ingredients that are usual for them in polymerizing vinyl acetate in emulsified condition.

Proportions that are satisfactory for general commercial operations are tabulated below, proportions here and elsewhere herein being expressed as parts by weight unless specifically stated to the contrary.

| Component | Suitable Range of Proportions |
|---|---|
| Vinyl acetate | 100. |
| Glue | 5–20. |
| Surface active agent | 0.3–2. |
| Chain terminator | 0–1. |
| Promoter | 0.1–1. |
| Water | 60–100. |
| Alkali | to make pH 3.5–5.5. |

As to conditions of operation, the polymerization of the vinyl acetate in contact with the glue is made at a temperature sufficiently elevated to give a commercially satisfactory rate of reaction but ordinarily below the temperature of boiling of the water in the composition at the prevailing pressure. Thus we use temperatures within the range 50°–100° C. and usually about 70°–90° C.

As to order of mixing, it is necessary that the vinyl acetate be emulsified with the glue while the vinyl acetate is largely at least in monomeric form. Especially satisfactory results are obtained when the emulsification with the glue is completed before the vinyl acetate is brought into contact with the material promoting polymerization. It is helpful also to introduce the premulsified vinyl acetate and glue mixture gradually into the reaction vessel and to introduce simultaneously and gradually also the promoter composition, so that there is at no time any objectionably high proportion of either the vinyl acetate or the promoter to the other component.

The emulsion of polyvinyl acetate, in the condition of having been thus polymerized in contact with the dispersed glue, may be used as such as an adhesive. It is economical and satisfactory, however, to mix this base component with additional water dispersible, substantially neutral adhesive, examples of which are glue, either commercial or the refined grade gelatin, or starch in pasted condition.

The invention will be further illustrated by description in connection with the following specific examples of the practice of it.

EXAMPLE 1

An emulsion of polyvinyl acetate polymerized in contact with glue was made of materials and in the proportions shown in the table that follows:

| No. | Component | Parts by Weight |
| --- | --- | --- |
| 1 | Vinyl acetate | 546 |
| 2 | Glue | 50 |
| 3 | Dodecyl mercaptan (chain terminator) | 2.2 |
| 4 | Triton X-200 (surfactant) | 4.8 |
| 5 | Potassium persulfate [1] (promoter) | 18 |
| 6 | Water | 200 |
| 7 | ----do---- | 200.8 |
| 8 | Potassium persulfate [1] | 12 |
| 9 | Sodium bicarbonate [1] | 12 |
| 10 | ----do [1] | 8 |

[1] Weight of 5% aqueous solution.

Procedure: Preemulsify components (1), (2), (4), and (6). Place resulting emulsion in dropping funnel. Place (7) and (10) in reactor and heat to 80–85° C. Add (3) and (5). Start flow of said emulsion and, at the stages when ⅓, ⅔ and all of it is in, add ⅓ of (8) and ⅓ of (9) at each of said stages. Then raise the temperature to 90° C. Hold ½ hour, cool and discharge the product.

The chain terminator is required to give exceptional film clarity when the product is used as an adhesive.

The sodium bicarbonate in the amount used gives a pH within the range 4–5, which we have found to give particularly satisfactory results, and the rate of addition of sodium bicarbonate is such as to maintain the pH within this range during practically the entire polymerization. With the stronger alkalies such as sodium hydroxide, smaller amounts are adequate to establish the same pH.

EXAMPLE 2

Decalcomania adhesive 100 parts of the 55% emulsion of polyvinyl acetate in the condition of having been polymerized in contact with the glue as described in Example 1 were mixed with liquid animal glue containing 35% solids prepared by dissolving 25 parts on the dry basis of commercial hide glue and 10 of urea in 65 of water. This solution was then compounded as follows:

| | |
| --- | --- |
| Liquefied animal glue solution | 30 |
| Glycerin (humectant) | 5 |
| Polyvinyl acetate and glue emulsion of Example 1 | 100 |
| Nonionic surface active agent (alkyl aryl polyether alcohol "Triton-100") | 4 |
| | 139 |

The glycerin is added for its usual effect and may be omitted.

The above composition shows superior excellent adhesive properties to conventional decals, is stable in storage, possesses the required "slip" properties of a decal adhesive, and leaves clearer dried films than may be obtained by admixing glue with commercially available polyvinyl acetate emulsions.

By "slip" properties we refer to that property which allows the decalcomania to be easily moved, after rewetting, on the surface to which it is to be adhered, for a sufficient amount of time to properly locate the decalcomania without excessive wrinkling.

Previous decalcomania adhesives based on gelatin have been limited in their adhesive application. Decalcomania adhesives made with polyvinyl acetate, on the other hand, lacked the desired "slip."

Adhesives based on mixtures of both types have been found heretofore to give properties somewhat between the two as regards adhesiveness and "slip," but to fail in being incompatible, in both dry film and liquid state. We have found that polyvinyl acetate polymerized in contact with dispersed glue gives compatibility with additional glue admixed and dispersed subsequent to the polymerization.

EXAMPLE 3

Wood adhesive

Olsen maple block shearing tests were made on blocks adhered with (1) the emulsion prepared in Example 1, (2) the same emulsion extended by the additives animal glue, and (3) polyvinyl acetate emulsion containing, as the additives, emulsifiers and protective colloids commonly used in polyvinyl acetate adhesives for wood.

Details of the conditions for bonding wood pieces are as follows:

| | | |
| --- | --- | --- |
| Construction of pieces bonded | maple laminae | ¾" |
| Closed assembly time | mins | 5 |
| Pressure | p.s.i. | 150 |
| Pressure period | hrs | 4 |
| Maturing period | days | 6 |

*Polyvinyl acetate wood adhesive*

| Adhesive Used | Shearing Test, p.s.i. | Failure in Glue Line, Percent of Total |
| --- | --- | --- |
| Product of Example 1 | 3,195 | 60 |
| Same+additional glue | 3,715 | 70 |
| PVAc emul.+CMC (protective colloid) No. 1 | 2,335 | 100 |
| PVAc emul.+CMC (protective colloid) No. 2 | 2,235 | 65 |

The PVAc polymerized in contact with glue dispersion and then mixed with additional glue not only was the best in the test but also was stable in water solution.

The material referred to herein as carboxy methyl cellulose or CMC is actually the sodium salt of carboxy methyl clelulose.

It will be understood that it is intended to cover all changes and modifications of the examples of the invention herein chosen for the purpose of illustration which do not constitute departures from the spirit and scope of the invention.

What we claim is:

1. In making an adhesive composition the process which comprises forming an aqueous emulsion of 100 parts by weight of vinyl acetate, 5–20 parts of animal glue, about 0.1–1 part of an initiator of polymerization of vinyl acetate, an alkali metal alkali in amount to establish the pH of the emulsion at about 3.5–5.5, and a glue liquifying agent in the proportion of about 10–50 parts for 100 parts of the glue, warming the emulsion at a temperature within the range approximately 50°–100° C. until the vinyl acetate is polymerized to polyvinyl acetate, and then admixing into the composition so formed an additional portion of the said glue in amount to make the total glue used not more than about 50 parts, the glue at no time having been heated to a temperature substantially above 100° C.

2. An adhesive comprising the product of polymerizing 100 parts by weight of vinyl acetate in an aqueous emulsion in contact with an alkali metal alkali in proportion to establish the pH of the emulsion at about 3.5–5.5, 5–20 parts of animal glue, and about 0.1–1 part of an initiator of vinyl acetate polymerization at a temperature of about 50°–100° C. and additional animal glue admixed into the emulsion subsequent to the said polymerizing in proportion to make the total glue used not more than 50 parts, the glue at no time having been heated to a temperature substantially above 100° C.

References Cited in the file of this patent

UNITED STATES PATENTS

| | | |
|---|---|---|
| 2,498,792 | Cottet et al. | Feb. 28, 1950 |
| 2,650,170 | Kimball | Aug. 25, 1953 |
| 2,758,035 | Matthes | Aug. 7, 1956 |
| 2,853,457 | Gates | Sept. 23, 1958 |

FOREIGN PATENTS

| | | |
|---|---|---|
| 951,166 | France | Oct. 18, 1949 |